United States Patent [19]
Gohlisch et al.

[11] Patent Number: 5,472,332
[45] Date of Patent: Dec. 5, 1995

[54] EXTRUDER HEAD FOR AN EXTRUDER

[75] Inventors: Hans-Joachim Gohlisch, Hanover; Reinhold Kaufmann, Eschwege, both of Germany

[73] Assignee: Paul Troester Maschinenfabrik, Hanover, Germany

[21] Appl. No.: 134,285

[22] Filed: Oct. 8, 1993

[30] Foreign Application Priority Data

Oct. 20, 1992 [DE] Germany ............... 42 35 280.0

[51] Int. Cl.⁶ ............................................. B29C 47/12
[52] U.S. Cl. ...................... 425/186; 264/39; 425/188; 425/192 R
[58] Field of Search ................ 425/450.1, 192 R, 425/188, 190, 135, 186; 264/39

[56] References Cited

U.S. PATENT DOCUMENTS

| | | | |
|---|---|---|---|
| 3,902,835 | 9/1975 | Theysohn | 425/188 |
| 4,354,814 | 10/1982 | Grimminger et al. | 425/188 |
| 4,372,736 | 2/1983 | Gooch et al. | 425/149 |
| 4,548,568 | 10/1985 | Herbert et al. | 425/188 |
| 4,728,279 | 3/1988 | Bellmer | 425/188 |
| 4,799,874 | 1/1989 | Bellmer et al. | 425/190 |
| 4,824,353 | 4/1989 | Hirschkorn | 425/190 |
| 4,983,113 | 1/1991 | Hirschkorn | 425/190 |
| 4,995,802 | 2/1991 | Müller et al. | 425/190 |

*Primary Examiner*—Jay H. Woo
*Assistant Examiner*—Joseph Leyson
*Attorney, Agent, or Firm*—Emmanuel J. Lobato

[57] ABSTRACT

A screw extruder, for use with or without a calender, has a divided or split extruder head with upper and lower parts or halves hingedly mounted on a collar secured to a flange at the discharge end of the extruder cylinder. Each of the upper and lower extruder halves is movable between an open innoperative position and a closed operative position by a piston cylinder unit acting between a fixture on the respective extruder head part and a fixture on the extruder cylinder. When in closed position, the upper and lower extruder head parts or halves are pressed toward one another by a pair of vertical piston-cylinder units, each having a cylinder with lower end engaging the upper extruder head part and a projection on a piston rod engaging the lower extruder head part. The vertical piston-cylinder units are mounted on pivoted carriers mounted on the collar on the extruder cylinder. The two carriers are interconnected by a horizontal piston-cylinder and are also movable vertically. Operation of the apparatus is effected by an electro-hydraulic control circuit having a processor by which sequential operation of the piston-cylinder units is controlled.

8 Claims, 6 Drawing Sheets

EXTRUDER HEAD FOR AN EXTRUDER

FIELD OF INVENTION

The invention relates to a split extruder head for an extruder, in particular for use in an extruder-calender combination, consisting of a part to be connected with the extruder cylinder and cylindrically surrounding the extrusion to be produced during operation, and, connected therewith, one hinged part surrounding the extrusion nip half way by means of a joint which can be pressed together sealingly with another other part surrounding the extrusion nip, by means of two pressing units pivotably arranged on both sides.

BACKGROUND OF THE INVENTION

The extruder-calender combination of DE-29 37 204 C2 is constructed in a similar manner: Pressing units attached on the calender and consisting of a tie rod and a piston-cylinder unit actuating the latter press together the two parts or halves of a horizontally divided or split extruder head secured on the extruder. This creates a union between extruder and calender releasable for cleaning purposes, but which never permits using the extruder without the calender and which also does not permit adjusting the distance between the mouthpiece of the extruder head and the nip of the calender during operation, as would be of advantage for adjustment of the optimal working of the extruded product in the roller gap (DE 40 34 268 C2).

Through U.S. Pat. No. 4,060,368 there has become known an extruder calender combination whose two extruder head halves are held together by several piston-cylinder units which, arranged in vertical direction, bring about also the undisplaceable relation of extruder and calender during operation.

This undisplaceable relation of the extruder and calender is a disadvantage in cases where, for reasons of adjusting the treatment intensity in the roller gap, the distance between extruder and calender is to be changed during operation, as has been proposed in DE-PS 40 09 917. It is here necessary to take the extruder head of the extruder off the calender entirely to be able to displace the two units relative to each other during operation.

This is the case in a prior form of realization of the present applicants, where the upper pivotable extruder head part is pressed together with the lower extruder head part by two laterally arranged piston-cylinder units, and where the piston-cylinder units are secured to the lower extruder head part by means of a joint, the axis of which is parallel to the axis of the extruder cylinder. This form of realization requires that each replacement extruder head is also equipped with a pair of piston-cylinder units, which when changing the extruder head, must be disconnected from and reconnected to their feed and discharge lines, unless it is preferred to remove the two piston-cylinder units as such from the bottom part of the replacement extruder head. This manipulation is cumbersome. With a hinged bottom part, the handling is made difficult by the piston-cylinder units being in the spread operative state.

SUMMARY OF THE INVENTION

The invention avoids these disadvantages. It is the object of the invention to mount the piston-cylinder units clamping the extruder head together so that the extruder with the extruder head fastened thereon can be used also without a calender for the production of uncalendered or unsmoothed plates, and that the distance of the extruder from the calender can be changed also during operation. It is another object of the present invention to mount the piston-cylinder units clamping the extruder head toegher so that they do not increase the weight of the extruder head bottom part, that handling is facilitated, and that they are re-usable universally for any replacement extruder head.

The invention consists in that the pressing units are piston-cylinder units which are arranged substantially in a vertical position, and that the pressing units are each arranged on a holder or mount which is pivotable about a substantially vertical axis.

This arrangement offers the essential advantage that the extruder-head unit, not separable during operation, is now no longer connected with the calender during operation, so that the distance between the extruder and the calender can be varied during operation and hence the knead forming in the nip can be given an optimal size and shape.

More important still is the advantage that the extruder can be used also without the calender. This advantage leads to a better utilization of the machine and is apparent whenever the extruder is operated sometimes with or sometimes without a calender.

It must be regarded as another special advantage of the invention that a standard extruder thus designed can be operated together with virtually every standard calender, and that, moreover, when an extruder head with exchangeable plates limiting the flow path of the extruded product in different ways is being used, a standard extruder head can be used. The use of such standard equipments increases their usability and lowers the prime cost. Calenders already existing in a plant can be made use of jointly with the extruder according to the invention, but also, when a new acquisition is made, first the extruder with the extruder head can be procured, then using the latter together with a calender purchased much later.

This arrangement leaves the piston-cylinder units in a place where they do not hinder the installing and cleaning operations, where they do not affect the weight of the bottom part, and allow the piston-cylinder units to be universally usable for all replacement extruder heads, it being assured that the extruder head and following calender are completely independent of each other.

This arrangement can be realized in an especially simple and advantageous manner in that the two parts to be pressed together with the pressing units have a recess on both sides, that the piston rod of the pressing units carries an abutment at its end, and that in the operating state of the extruder head the piston rod is in this recess.

To assure contactless insertion of the pressing units into the operating position, it is of advantage if the pressing unit and/or its holder is mounted for vertical displacement.

It is very easy to construct this apparatus if the holder embraces a journal by its one end and if at the end of the journal a piston-cylinder unit for lifting the holder is provided.

For easy pivoting and displaceability of the machine parts to be moved, it is advantageous if the holder is provided on its end surrounding the journal with a ball beating against which the piston rod of the piston-cylinder unit pushes for the lifting of the holder.

The pivoting of the pressing units can easily be obtained in a mechanized manner if at least one additional piston-cylinder unit is provided for the pivoting of the holders of the pressing units.

This additional piston-cylinder unit for pivoting the holder of the pressing units is especially easy to mount so that at each of the two holders a pivoting lever is arranged, at whose end this piston-cylinder unit for the pivoting of the holders of the pressing units is articulated.

The pivoting can be done with precision in a mechanized manner when limit stops are provided for limiting the excursion of the holders of the pressing units.

By automatic switching triggered by a manual switch the movement sequence of the opening and closing of the extruder head is easy to carry out if limit switches are provided at the limitation of the excusion excursion of the holders of the pressing units which switch the electrovalves for supply of pressure medium into the piston-cylinder unit(s) displacing the holders.

Such an automatic movement sequence can be realized in a simple manner if a processor with two push buttons is provided, one of which initiates a sequence:

pivoting the hinged head part or parts into the operating position pivoting the holders of the pressing units into the operating position pressure relief of the piston-cylinder unit raising the holder startup of the pressing units and the other of which initiates a sequence:

pressure relief in the pressing units pressurization of the piston-cylinder unit raising the holder pivoting of the holders of the pressing units into inoperative position pivoting of the hinged head part or parts into the inoperative position.

BRIEF DESCRIPTION OF THE INVENTION

The nature of the invention is described more specifically below with reference to an embodiment shown schematically in the drawings, in which.

DESCRIPTION OF ILLUSTRATED EMBODIMENT

On the flange 1 at the discharge end of the extruder cylinder 2 the fixed part 4 of the extruder head is secured by screws 3. To this fixed flange-type part the hinged bottom part 5 of the extruder head is articulated by means of a hinge joint 6, while the top part 7 is likewise articulated to the fixed part 4 by means of a hinge joint not shown. The top part 7 and bottom part 5 each have a bearing block 8, in which is mounted one end of a piston-cylinder unit 9, the other end of which is mounted in a bearing block 10, which is secured to the extruder cylinder The top part 7 and bottom part 5 are pressed together sealingly by vertical piston-cylinder units 11. The end face of each piston-cylinder unit 11 bears on a shoulder 12 of the top part 7. The piston rod 13 extends into a recess 14 in the top part 7 and of the bottom part 5 and carries at its end, by means of a nut 16, an annular disk 15, which by the pressure prevailing in the piston-cylinder unit 11, is pressed against the shoulder 17 at the bottom part 5. The shoulders 12, 17 form the boundaries of recesses 18, 19 in the bottom part 5 and top part 7.

Figure 1:
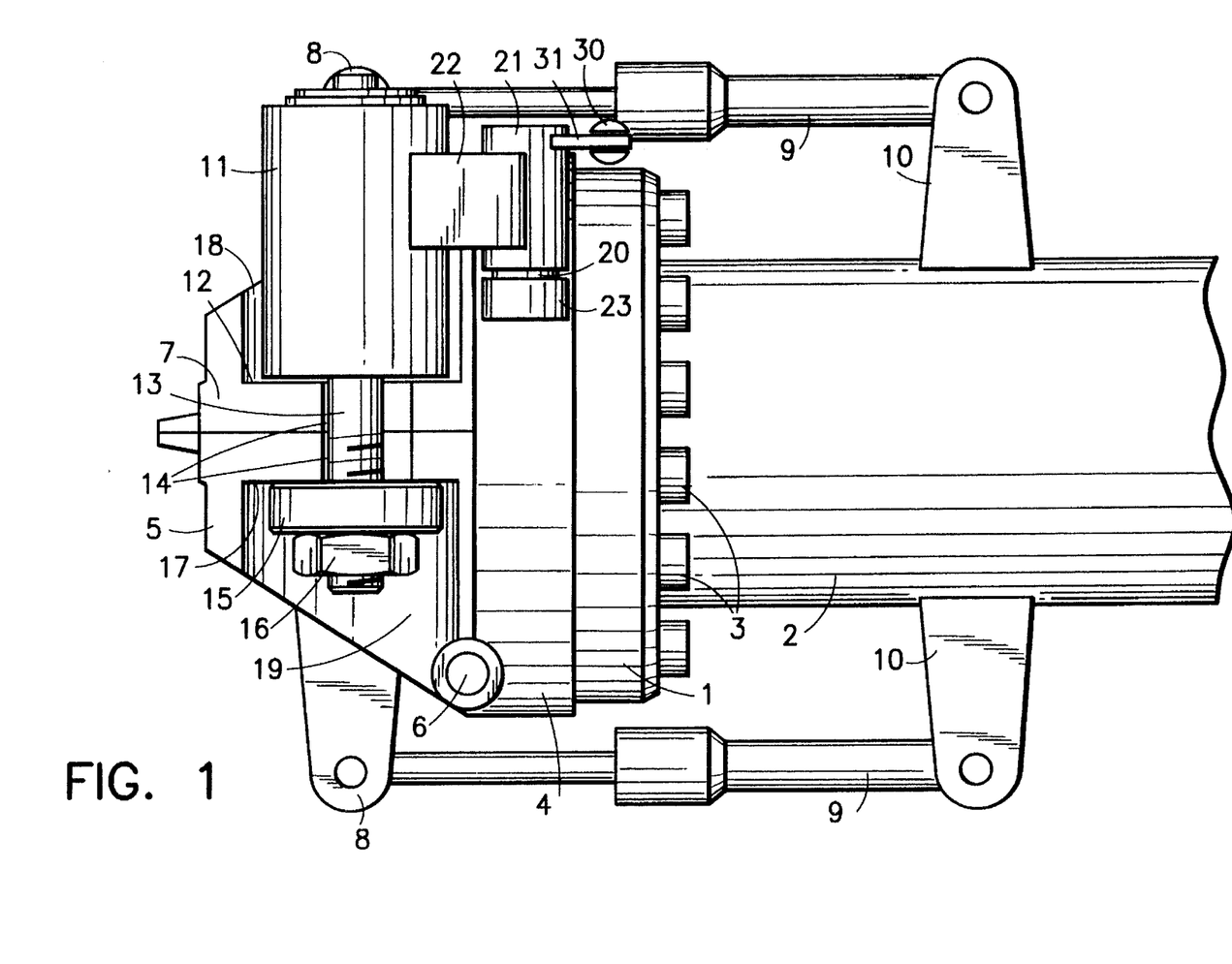
FIG. 1 is a side elevational view of the extruder head mounted on an extruder cylinder.
Figure 2:
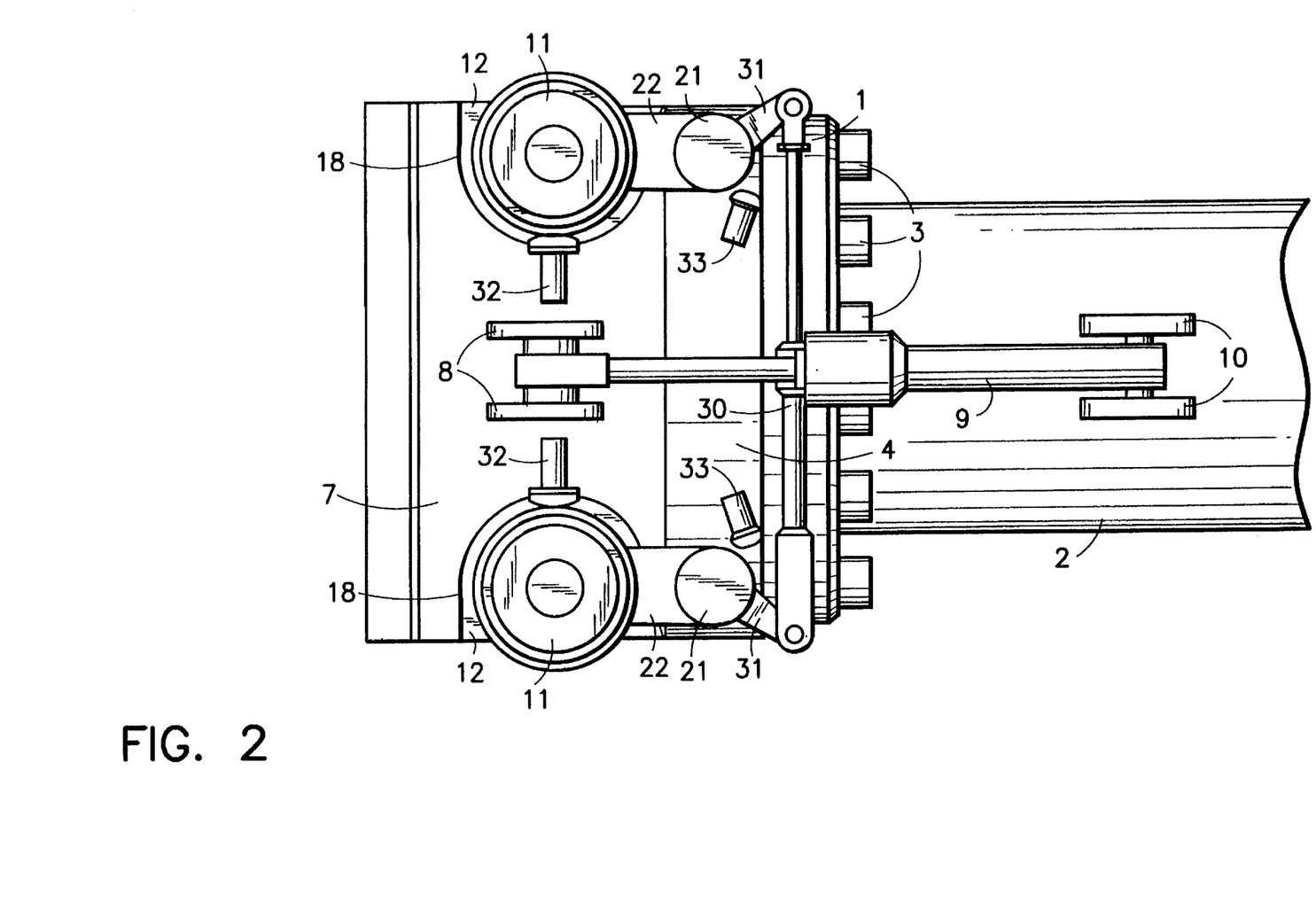
FIG. 2 is a top plan view of the extruder head with pressing units in operating position.
Figure 3:
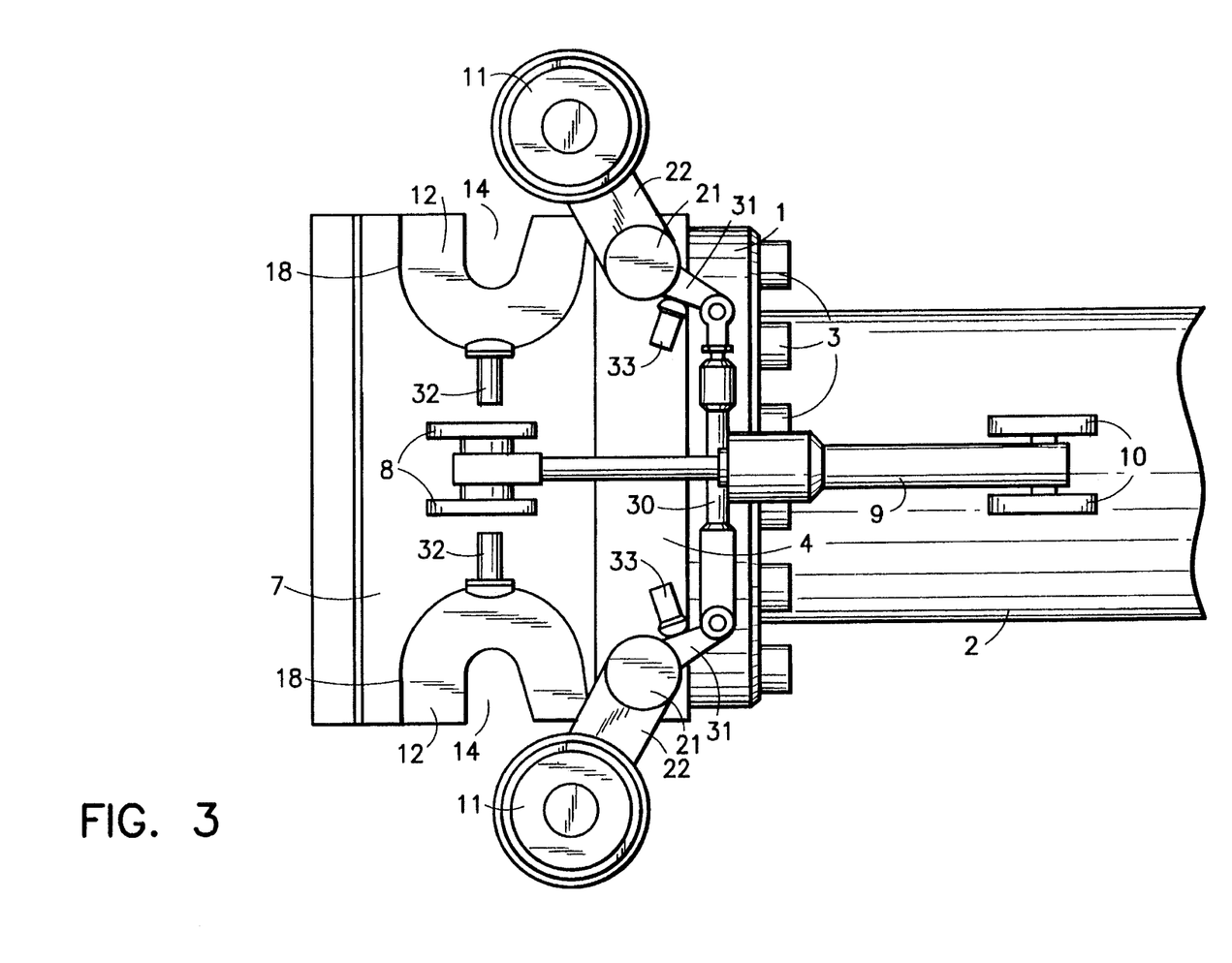
FIG. 3 is a top plan view of the extruder head with pressing units in a cleaning position.
Figure 4:
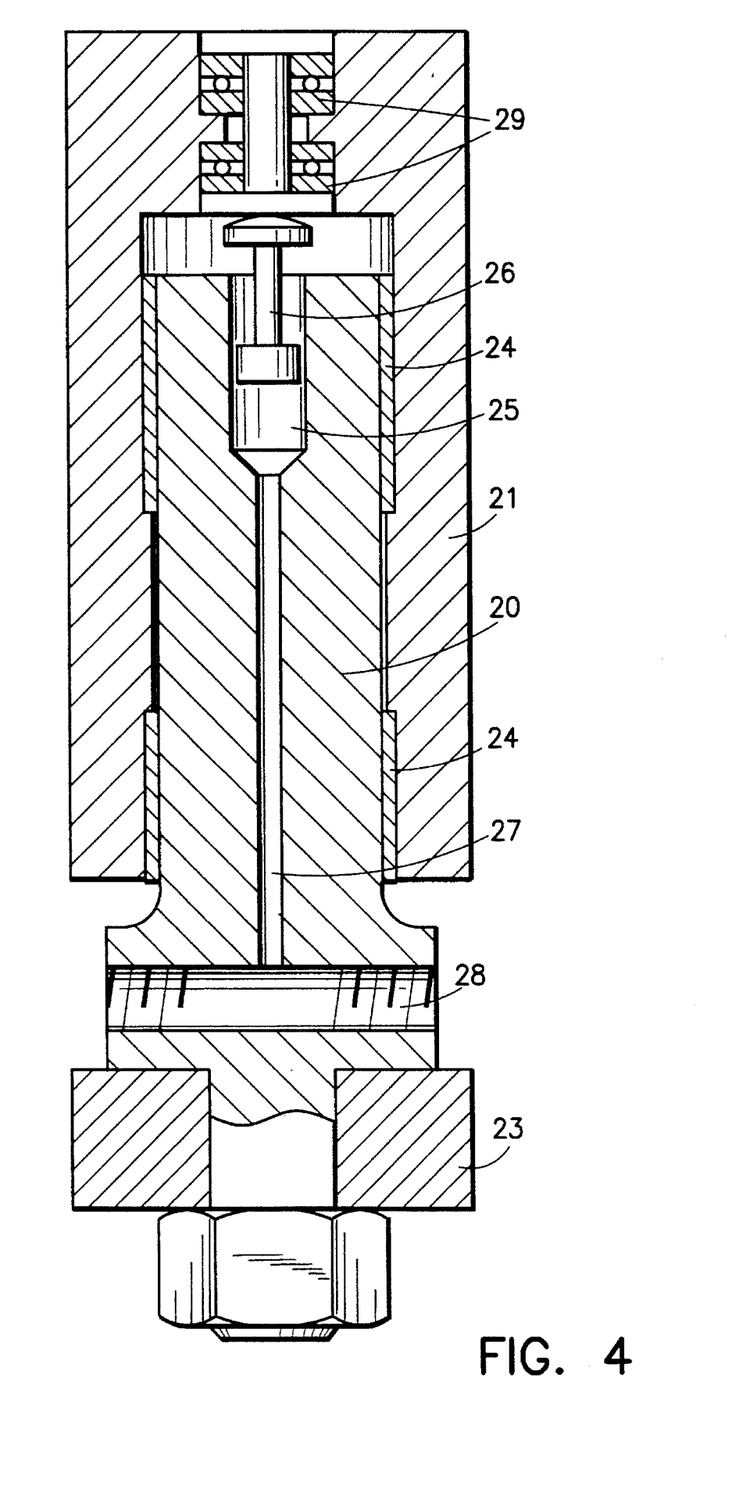
FIG. 4 is a section through the journal of the holder.

To provide for lateral movement of the piston-cylinder units 11 between operative positions for pressing the extruder head parts 5 and 7 together and displaced positions permitting opening of the extruder head parts 5 and 7, each of the piston-cylinder units 11 is mounted on a holder or carrier comprising a sleeve 21 (FIGS. 1 and 4) rotatable on a vertical shaft or journal 20 mounted on a bracket 23 and having a laterally projecting and 22 on which the piston-cyinder unit 11 is mounted. Between the sleeve 21 and the journal 20 are disposed sliding beatings 24 of a suitably chosen bearing material. To open the extruder head, the end face, pressing against shoulder 12, of the piston-cylinder 11 must be lifted off the latter. This occurs by means of the piston-cylinder unit 25, which is mounted in a cylindrical recess and is connected by a line or passage 27 to a pressure line 28. A piston rod 26 presses against a ball bearing 29, which is mounted in the sleeve 21, whereby the entire sleeve 21 with the mount 22 and with the piston-cylinder unit 11 is raised to the extent that the end face of the piston-cylinder unit 11 no longer touches the shoulder 12 and therefore can be freely pivoted out to the side. The nut 16 is slacked off to allow the unit 11 to clear the recess on the upper half of the extruder head.

This pivoting out occurs by means of a piston-cylinder unit 30 which is articulated by its ends to levers 31 permanently connected with sleeves 21 of the holders on which piston-cylinder units 11 are mounted. Limit stops 32 limit the excursion of the piston-cylinder unit 11 and determine the position in the closing and clamping together of the upper part 7 an the lower part 5, while limit stops 33 limit the excursion of lever 31 during opening.

Figure 5:
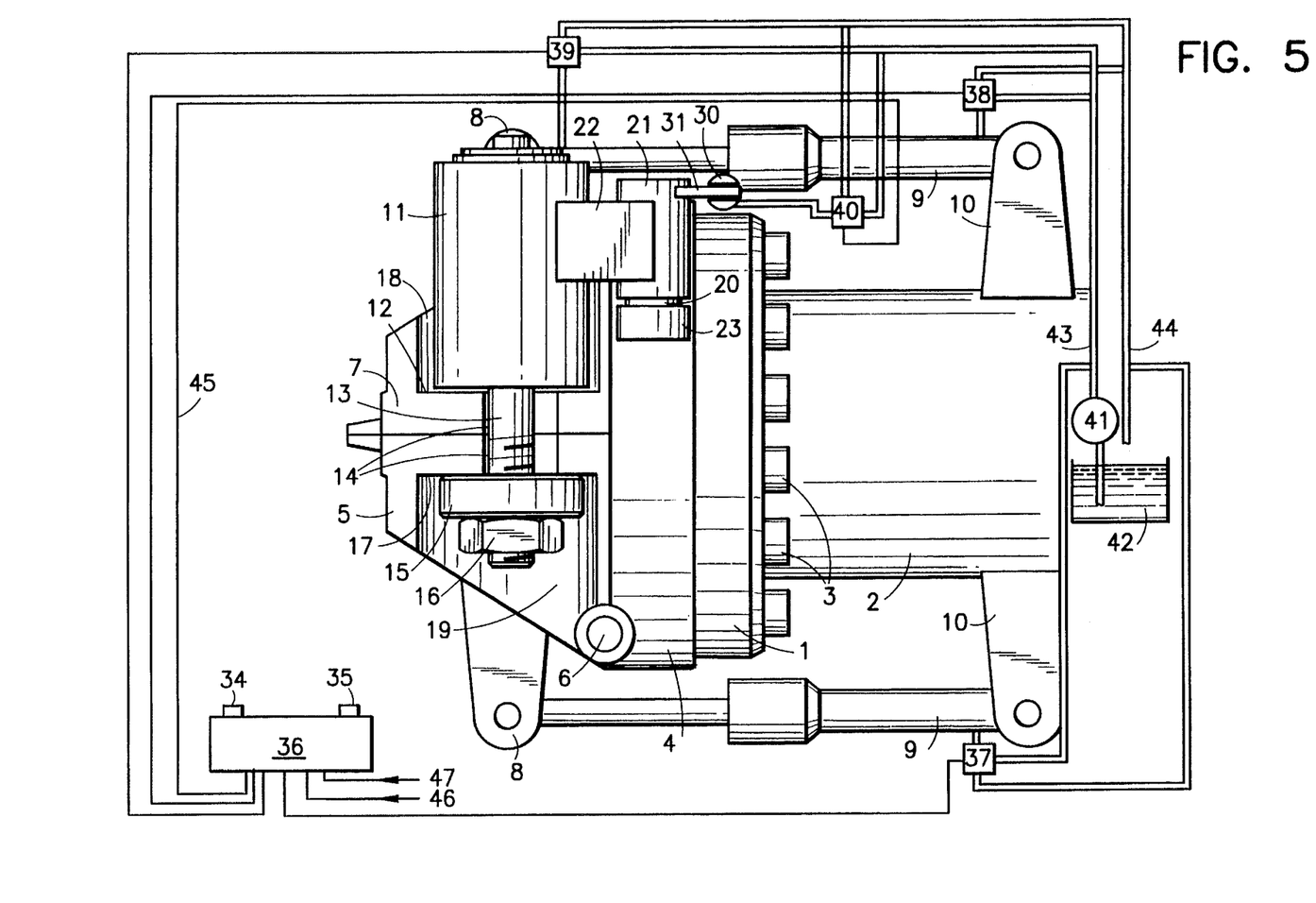
FIG. 5 is a side elevational view of the extruder head showing an electro-hydraulic control circuit diagram for controlling the apparatus.
Figure 6:
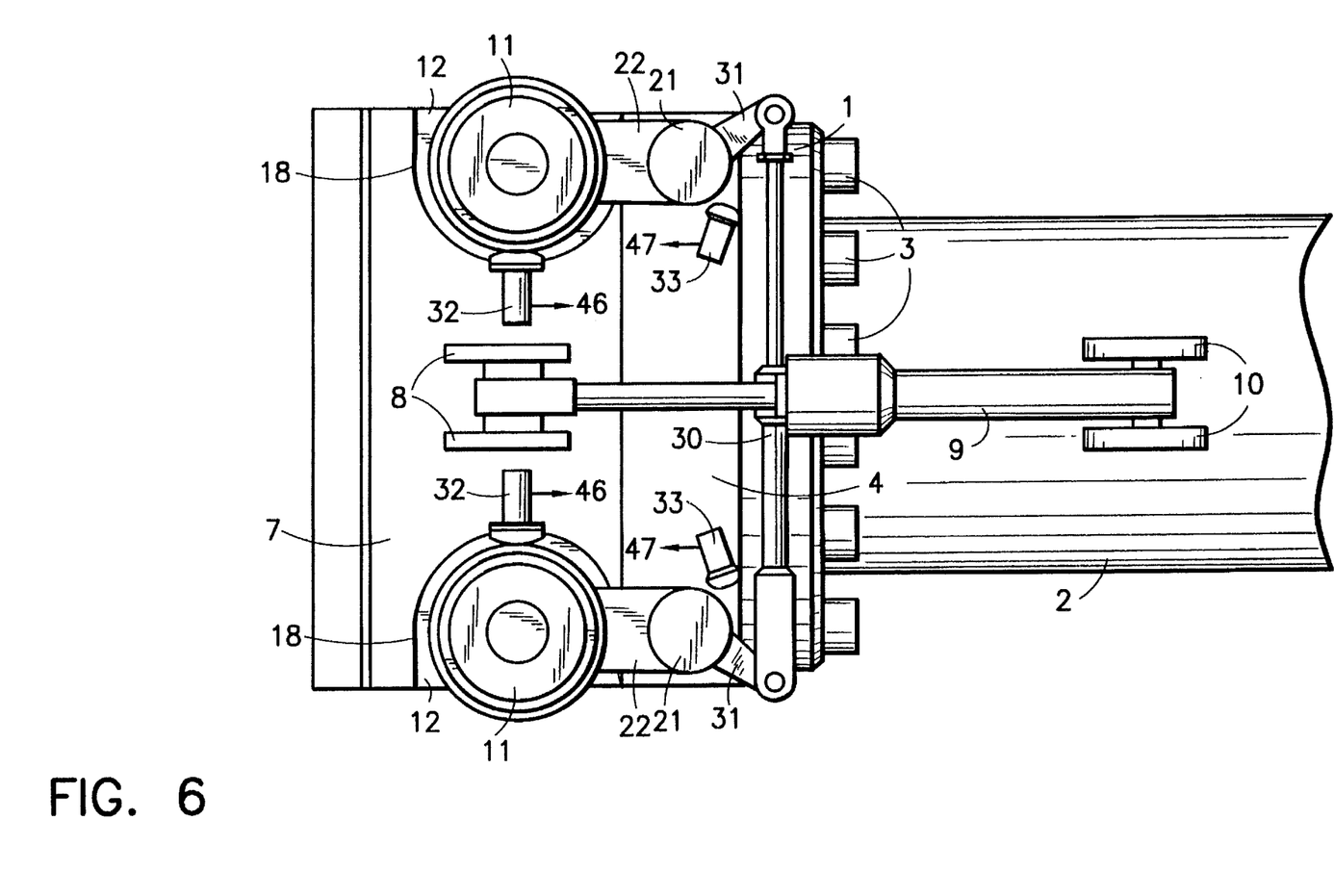
FIG. 6 is a top plan view of the extruder head showing the circuit diagram.

An electro-hydraulic control circuit for the apparatus is shown schematically in FIGS. 5 and 6. The circuit comprises a processor 36 having manually operable control buttons 34 and 35. The processor is connected by electric lines to magnetic valves for supplying hydraulic fluid to the several piston-cylinder units of the apparatus, namely a magnetic valve 37 for the lower piston-cylinder unit 9 for moving the bottom part 5 of the extruder head between open and closed position, a magnetic valve 38 for the upper piston-cylinder unit 9 for moving the top part 7 of the extruder head between open and closed positions, a magnetic valve 39 for the vertical piston-cylinder units 11 for pressing the top part 7 and bottom part 5 of the extruder head together and a magnetic valve 40 for the piston-cylinder units 25 in sleeves 21 (FIG. 4) for raising the piston-cylinder units 11. Hydraulic fluid for operating the several piston-cylinder units is supplied by a pump 41 from a reservoir 42 to a supply line 43 and is returned by a return line 44. The processor is also connected by the electric lines 46 to the limit stops 32 limiting lateral movement of the piston-cylinder units 11 and by electric lines 47 to the limit stops 33 for limit movement of the levers 31 the sleeves 1 and arms 22 on which the vertical piston-cylinder units are mounted.

Operation of the apparatus is as follows; To open the extrusion head for cleaning, an operator presses the button 34, whereupon the processor 36 gets a signal to open the extrusion head 5, 7. The processor thereupon sends pulses to magnetic valves 39 to supply hydraulic fluid to piston-cylinder units 11 to move the annular disks 15 away from the bottom part 5 of the extruder head so extruder head is relaxed. Next, the processor sends pulses to magnetic valve 40 to supply hydraulic fluid to the piston-cylinder unit 30 which connects arms 31 of sleeves 21 of the holders or carriers of the vertical piston-cylinder units 11 so as to move the pistonc-ylinder units 11 laterally away from the extruder head parts 5 and 7. In a third step, the processor sends a pulse to magnetic valves 37 and 38 of the lower and upper piston-cylinder units 9 for swinging the extruder head parts 5 and 7 to open position. The extruder head is thereby open for cleaning.

In order to close the extruder head to put the extruder in condition for operation, an operator presses button 35 of the processor. The processor first sends pulses to magnetic valves 37 and 38 to supply hydraulic fluid to piston-cylinder units 9 for swinging the extruder head parts 5 and 7 to closed position. In a second step, the processor sends a pulse to magnetic valve 40 to suply hydraulic fluid to the piston cylinder unit 30 to swing the piston-cylinder units 11 laterally in position to press the extruder head parts 5 and 7. In a third step, the processor sends pulses to magnetic valves 39 to supply hydraulic fluid to the piston-cylinder units 11 to press the lower part 5 and upper part 7 of the extruder head together. The extruder can then begin its work.

What we claim is:

1. A screw extruder comprising:

an extruder cylinder having a discharge end;

a split extruder head mounted on said extruder cylinder discharge end for extruding therethrough;

said extruder head having two halves comprising an upper half and a lower half each swingably mounted for actuation to a closed position for extruding therethrough and an open position providing access to the interior of the extruder cylinder for cleaning interiorly of the extruder cylinder;

a pair of clamping devices mounted on said extruder head for applying clamping pressure to the two halves respectively in said closed position during said extruding therethrough;

said clamping devices comprising a first pair of swingably mounted selectively energized fluid-energized piston-cylinder units each having a piston rod releasably coupled to said two halves for applying clamping pressure to the two halves vertically toward each other;

each said piston-cylinder unit having a respective rotatable vertical-axis pivotal mount on said extruder head selectively rotatable for swinging a corresponding piston-cylinder unit laterally in a respective horizontal direction after uncoupling the individual units from the corresponding extruder head half and swinging each one clear of the extruder head halves for allowing opening of the extruder head and swingably restoring the corresponding unit to a position coupled to said extruder head half in readiness for applying clamping pressure thereto and clamping said halve when the extruder halves are in said closed position;

each piston-cylinder unit having said piston rod and coupling means thereon coactive with the respective extruder head half for releasably coupling a corresponding piston rod to said extruder head halves and uncoupling thereof in dependence upon the direction of rotation of the corresponding pivotal mount;

another fluid-energized piston-cylinder device mounted on said extruder head having a piston rod operably connected to each pivotal mount for selectively rotating each pivotal mount in directions for effecting said uncoupling and coupling of the corresponding swingable units and the swinging thereof;

a second pair of fluid-energized piston-cylinder devices mounted on said extruder cylinder and each having a piston rod connected respectively to a corresponding extruder head half for actuating the halves to said open position and to said closed position in timed relationship with the uncoupling and swinging of the clamping devices; and each pivotal mount comprises a rotatable sleeve on the vertical axis of the mount and a carrier arm extending from the sleeve of the corresponding unit.

2. A screw extruder comprising:

an extruder cylinder having a discharge end;

a split extruder head mounted on said extruder cylinder discharge end for extruding therethrough;

said extruder head having two halves comprising an upper half and a lower half each swingably mounted for actuation to a closed position for extruding therethrough and an open position providing access to the interior of the extruder cylinder for cleaning interiorly of the extruder cylinder;

a pair of clamping devices mounted on said extruder head for applying clamping pressure to the two halves respectively in said closed position during said extruding therethrough;

said clamping devices comprising a first pair of swingably mounted selectively energized fluid-energized piston-cylinder units each having a piston rod releasably coupled to said two halves for applying clamping pressure to the two halves vertically toward each other;

each said piston-cylinder unit having a respective rotatable vertical-axis pivotal mount on said extruder head selectively rotatable for swinging a corresponding piston-cylinder unit laterally in a respective horizontal direction after uncoupling the individual units from the corresponding extruder head half and swinging each one clear of the extruder head halves for allowing opening of the extruder head and swingably restoring the corresponding unit to a position coupled to said extruder head half in readiness for applying clamping pressure thereto and clamping said halves when the extruder halves are in said closed position;

each piston-cylinder unit having said piston rod and coupling means thereon coactive with the respective extruder head half for releasably coupling a corresponding piston rod to said extruder head halves and uncoupling thereof in dependence upon the direction of rotation of the corresponding pivotal mount;

another fluid-energized piston-cylinder device mounted on said extruder head having a piston rod operably connected to each pivotal mount for selectively rotating each pivotal mount in directions for effecting said uncoupling and coupling of the corresponding swingable units and the swinging thereof;

a second pair of fluid-energized piston-cylinder devices mounted on said extruder cylinder and each having a piston rod connected respectively to a corresponding extruder head half for actuating the halves to said open position and to said closed position in timed relationship with the uncoupling and swinging of the clamping devices; and said upper half of the split extruder having recesses, each piston-cylinder having the cylinder thereof seated in a respective recess when the extruder is in a closed condition, and each pivotal mount including means for lifting the corresponding piston-cylinder unit upwardly to disengage from said recess prior to swinging of each unit laterally.

3. A screw extruder comprising:

an extruder cylinder having a discharge end;

a split extruder head mounted on said extruder cylinder discharge end for extruding therethrough;

said extruder head having two halves comprising an upper half and a lower half each swingably mounted for actuation to a closed position for extruding therethrough and an open position providing access to the interior of the extruder cylinder for cleaning interiorly of the extruder cylinder;

a pair of clamping devices mounted on said extruder head for applying clamping pressure to the two halves respectively in said closed position during said extruding therethrough;

said clamping devices comprising a first pair of swingably mounted selectively energized fluid-energized piston-cylinder units each having a piston rod releasably coupled to said two halves for applying clamping pressure to the two halves vertically toward each other;

each said piston-cylinder unit having a respective rotatable vertical-axis pivotal mount on said extruder head selectively rotatable for swinging a corresponding piston-cylinder unit laterally in a respective horizontal direction after uncoupling the individual units from the corresponding extruder head half and swinging each one clear of the extruder head halves for allowing opening of the extruder head and swingably restoring the corresponding unit to a position coupled to said extruder head half in readiness for applying clamping pressure thereto and clamping said halves when the extruder halves are in said closed position;

each piston-cylinder unit having said piston rod and coupling means thereon coactive with the respective extruder head half for releasably coupling a corresponding piston rod to said extruder head halves and uncoupling thereof in dependence upon the direction of rotation of the corresponding pivotal mount;

another fluid-energized piston-cylinder device mounted on said extruder head having a piston rod operably connoted to each pivotal mount for selectively rotating each pivotal mount in directions for effecting said uncoupling and coupling of the corresponding swingable units and the swinging thereof;

a second pair of fluid-energized piston-cylinder devices mounted on said extruder cylinder and each having a piston rod connected respectively to a corresponding extruder head half for actuating the halves to said open position and to said closed position in timed relationship with the uncoupling and swinging of the clamping devices; and said pivotal mount including means for lifting the corresponding fluid-energized piston-cylinder unit upwardly for disengaging and uncoupling the corresponding unit from the corresponding extruder head half prior to swinging of the corresponding unit laterally.

4. A screw extruder according to claim 3, including means for removably mounting said extruder head on said extruder cylinder.

5. A screw extruder according to claim 3, including limit stops for limiting the rotation of each individual pivotal mount thereby to limit the extent of swinging of the clamping devices for clearing the extruder head for opening and closing thereof by the two halves.

6. A screw extruder according to claim 3, including an electro-hydraulic energizing circuit for energizing all the fluid-energized piston-cylinder devices in timed relationship.

7. A screw extruder according to claim 6, including an electric control circuit for controlling the timed relationship and sequence in which all the fluid-energized devices are energized by said energizing circuit.

8. A screw extruder according to claim 3, in which both clamping devices comprise coupling means for applying said clamping pressure to said upper half and lower half of the extruder head.

\* \* \* \* \*